July 6, 1965   R. D. COLINET   3,193,660
CONVERTIBLE VERTICAL WELDING MACHINE
Filed Sept. 4, 1963   10 Sheets-Sheet 2
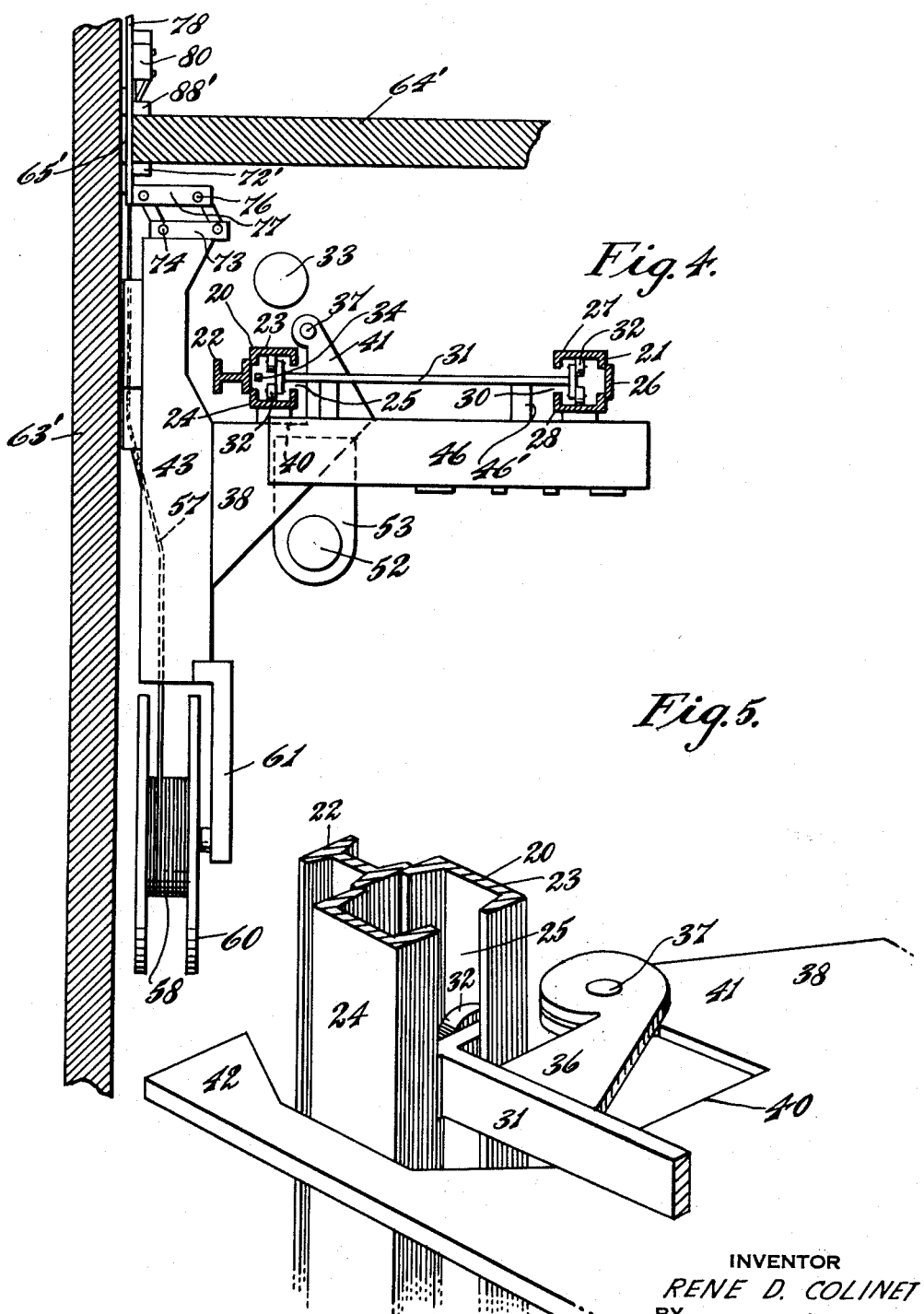
INVENTOR
*RENE D. COLINET*
BY
ATTORNEYS July 6, 1965  R. D. COLINET  3,193,660
CONVERTIBLE VERTICAL WELDING MACHINE
Filed Sept. 4, 1963  10 Sheets-Sheet 3
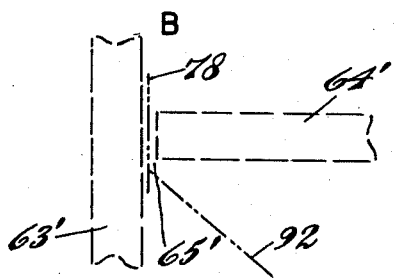
Fig. 6.
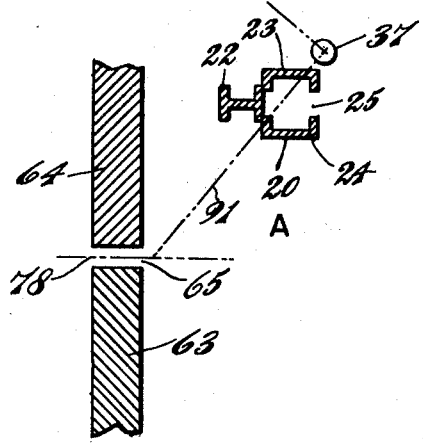
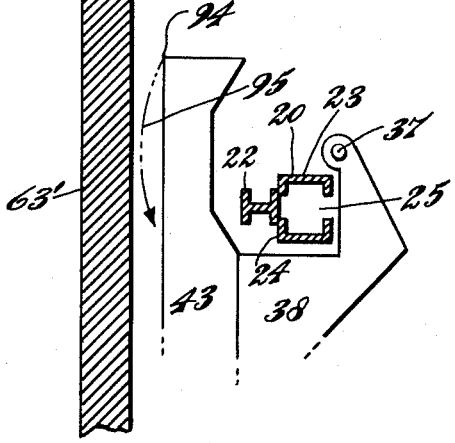
Fig. 8.
Fig. 7.
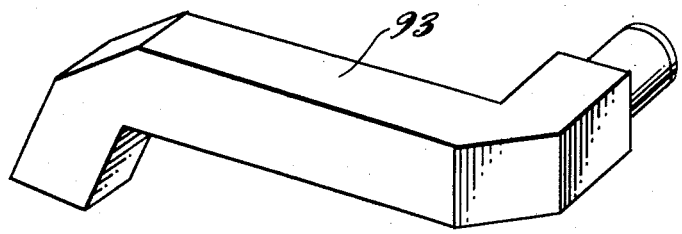
INVENTOR
RENE D. COLINET
BY
ATTORNEYS July 6, 1965  R. D. COLINET  3,193,660
CONVERTIBLE VERTICAL WELDING MACHINE
Filed Sept. 4, 1963  10 Sheets-Sheet 4

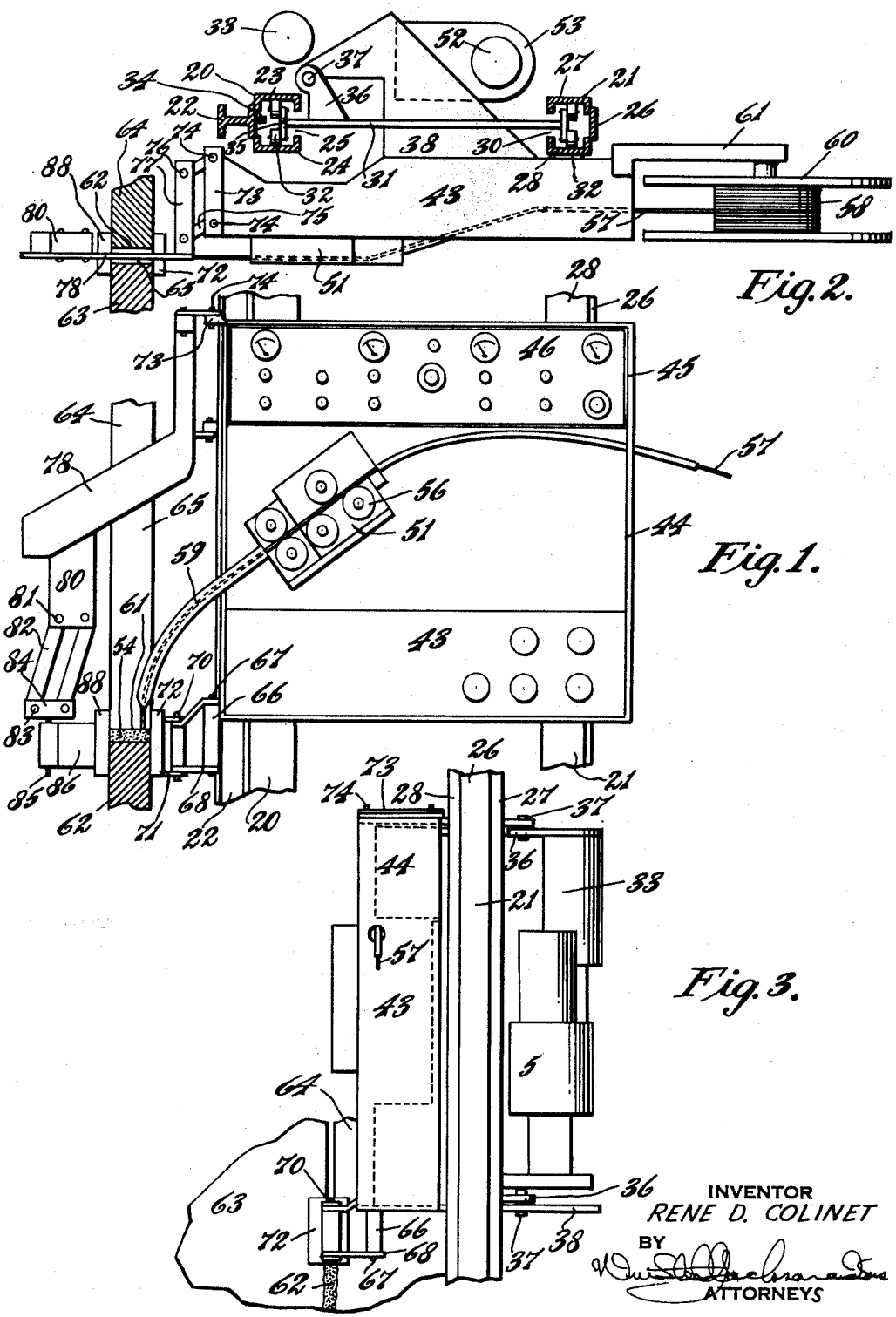

INVENTOR
RENE D. COLINET
BY
ATTORNEYS

July 6, 1965    R. D. COLINET    3,193,660
CONVERTIBLE VERTICAL WELDING MACHINE
Filed Sept. 4, 1963    10 Sheets-Sheet 7

INVENTOR
Rene D. Colinet
BY
ATTORNEY

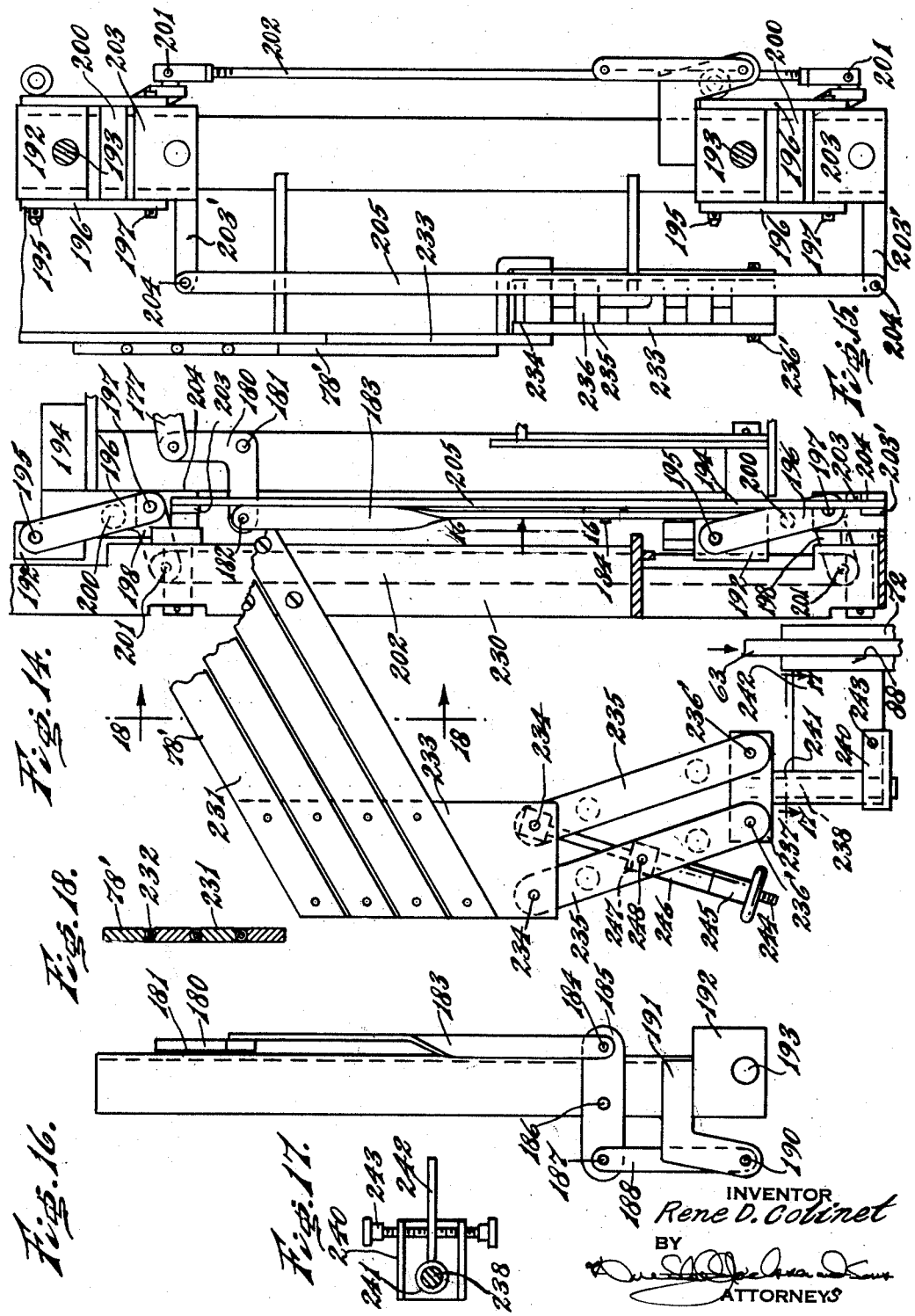

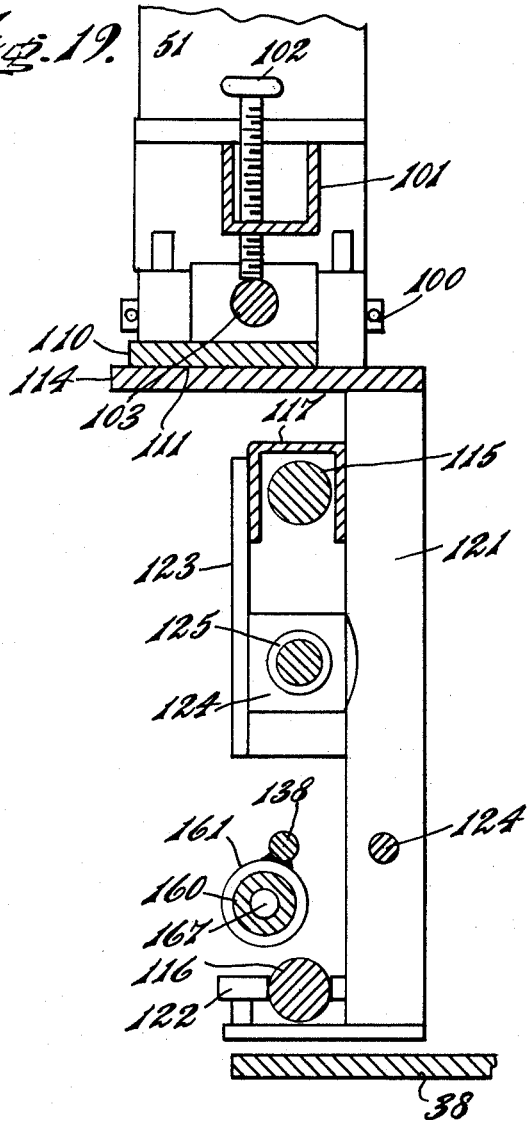

United States Patent Office 3,193,660
Patented July 6, 1965

3,193,660
CONVERTIBLE VERTICAL WELDING MACHINE
Rene D. Colinet, Philadelphia, Pa., assignor to La Soudure Electrique Autogene, S.A., Brussels, Belgium, a corporation of Belgium
Filed Sept. 4, 1963, Ser. No. 306,545
13 Claims. (Cl. 219—126)

The present invention concerns automatic machines for upward welding of vertical joints between plates in weldable metals such as steel, ferrous alloys of many types, aluminum and its alloys, copper and copper base alloys, and the like.

A purpose of the invention is to provide a single machine which can be used by change of position to weld vertical butt joints, vertical corner joints and vertical T-joints in plates.

A further purpose is to permit access and operation from both the front and the rear of a panel controlling certain parts of the welding operation.

A further purpose is to hinge a carriage or the like of a welding machine on a vertical pivot and to permit the carriage to occupy a position either transverse or longitudinal to one or more plates to be welded.

A further purpose is to support a welding carriage by a bracket from a column and to make the bracket substantially surround or encompass the column on three sides thereof.

A further purpose is to provide a welding machine hinged on a vertical axis and movable between two positions, the line from the hinge axis to the joint to be welded in one position being perpendicular to the line through the hinge axis to the joint to be welded in the other position.

A further purpose is to permit observation of the weld pool by a combined periscope and telescope.

A further purpose is to permit locking a holder which supports a shoe which confines the weld pool in position with respect to the plates and unlocking the holder from the rotatable portion of the machine as desired.

A further purpose is to provide a vertically movable carriage on uprights which mounts a swingable carriage which carries electrode feed mechanism and is capable of occupying either of two positions.

A further purpose is to keep the weld shoes always parallel to one another while they move relatively to one another.

A further purpose is to permit adjusting the inboard weld shoe from one end of the swingable carriage.

A further purpose is to mount a vertically moving carriage on two uprights, one of which is near to and the other of which is far from the work, and to pivot a swingable carriage on the vertically movable carriage at a point near to and behind the work adjacent upright.

A further purpose is to mount an inboard shoe on a swingable carriage, to mount an outboard shoe on a blade connected with the swingable carriage and adapted to extend through a weld gap, and to detachably secure the blade to the swingable carriage and alternately to secure the blade to the weld plates so that it will maintain its position when it is detached from the swingable carriage.

A further purpose is to form the blade of beams extending through the weld gap and to locate tubes on the edges of the beams and to provide mediums flowing through the tubes to cool the shoes and to shield the welding arc.

Further purposes appear in the specification and in the claims.

In the drawings I have chosen to illustrate a few only of the numerous embodiments in which the invention may appear, selecting the forms shown from the standpoints of convenience in illustration, satisfactory operation and clear demonstration of the principles involved.

FIGURE 1 is a diagrammatic fragmentary front elevation of one form of the device of the invention in position to weld a butt joint, the view being partly in section through the weld bead which has previously been produced.

FIGURE 2 is a top plan section through the device of FIGURE 1, the section being taken through the plates to be welded and through column supports above the position of FIGURE 1.

FIGURE 3 is a fragmentary side end view of the machine of FIGURES 1 and 2.

FIGURE 4 is a view similar to FIGURE 2 but showing the machine rearranged to weld a T-joint, and with different shoes in place.

FIGURE 5 is a detail perspective of one of the columns partially sectioned away, and the pivot for the upper bracket and the bracket on which the carriage swings back and forth between the butt welding position and the T-welding position.

FIGURE 6 is a diagrammatic plan view showing the relation between the pivot axis and the butt joint, and also the axis and the T-joint, the butt joint being shown in solid line and the T-joint being shown in phantom.

FIGURE 7 is a perspective of a combined telescope and periscope useful in the present invention.

FIGURE 8 is a plan section showing the clearance for swinging the carriage from the position in which a T-joint can be welded.

FIGURE 14 is a fragmentary diagrammatic front elevation showing mechanism for mounting inboard and outboard shoes and also showing the end of one of the plates.

FIGURE 15 is a left side view of mechanism shown in FIGURE 14.

FIGURE 16 is a right side section of the mechanism of FIGURE 14, the view being taken on the line 16—16 of FIGURE 14.

FIGURE 17 is a fragmentary top plan view showing one of the adjustments for the position of the outboard shoe, the view being a section on the line 17—17 of FIGURE 14.

FIGURE 18 is a section on the line 18—18 of FIGURE 14 showing the construction of the blade.

FIGURE 19 is a left side section on the line 19—19 of FIGURE 11.

Figure 9:
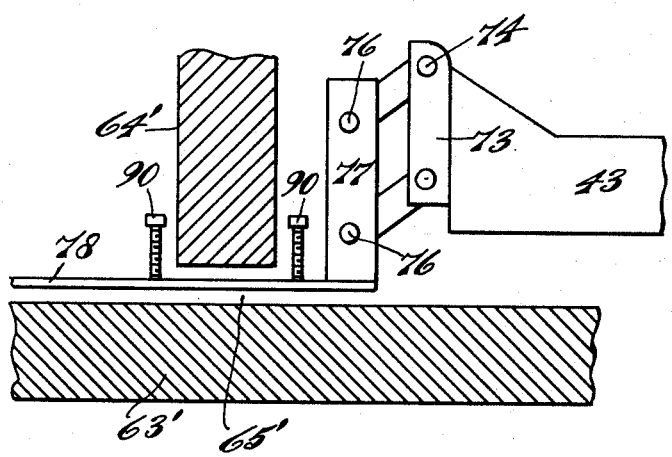
FIGURE 9 is a plan section showing the means for securing the holder for the outboard or remote shoe with respect to the continuous plate when a T-joint is being welded.

Automatic welding machines are generally known which are intended primarily for producing vertical butt joints in plates which are in a single plane, placed edge to edge with a suitable gap usually about ¾ inch, and employing either a gas protected electric arc or so-called electrogas process, or a pool of semiconductive molten slag floating on the molten weld pool using the so-called electroslag process. In the electroslag process the slag acts as a resistor or heating medium by virtue of its own electric resistance to the passage of the welding current supplied by a fusible, automatically fed electrode unwinding from a coil or metallic wire.

In both of these devices, a traverse reciprocating motion is supplied to the welding electrode or electrodes, known in the art as a "traverse," which involves reciprocation back and forth in the direction of the thickness of the plates or across the faces of the ends being welded, from one shoe which is usually copper and retains the weld pool at one face of the plates to a similar shoe at the opposite face. This motion distributes the heat evenly across the plate thickness and is also desirable to subject the weld metal to a succession of reheats in decreasing cycles separated by periods of cooling, a sequence which reduces the grain size during final solidification.

Apart from butt welding machines as above described, there are other machines which have been designed to weld vertical corner joints, between perpendicular plates. They use triangular or otherwise profiled shoes and the traverse motion of the electrodes is directed along the bisectrix of the angle between the plates. Standard existing butt welding machines can generally accommodate welding of internal and external corners with little or no trouble.

It is very difficult, however, to weld a true T-joint with prior art machines in which the weld must fill the gap between one continuous vertical plate and one interrupted vertical plate which is positioned perpendicular thereto. Such through welding is desirable for maximum strength of the joint and because it does not produce incipient cracks at the apex of corrner welds, which are generally called "fillets," when leaving as in the prior art between two faces of the interrupted plate an unwelded narrow seam.

In order to weld T-joints in which one plate is continuous, the welding machine must provide a traverse motion which is parallel to the continuous plate, and close to its face. Therefore the machine can longer extend front and back from the vertical plane of its welding electrode, but all the working parts must be confined to one side only of this plane.

The device of the present invention solves the problem of producing an effective machine for welding T-joints in which one of the plates is continuous, and also makes it possible to convert for this purpose a machine originally intended to weld only butt joints and corner joints, so that the new single machine will perform all three functions.

In the device of the invention the controls are assessible to the operator from the side of the machine which in the T-joint is away from the continuous plate. When welding butt joints and corner joints, the controls on the other hand are on the same face of the machine as the welding electrode.

The device of the invention relieves the user from the necessity of having two machines, one of which will weld butt joints of plates and the other one, less frequently used, will weld T-joints, which are employed in large steel weldments, for stiffeners of large welded beams, and in box-like frames used in heavy presses, bulkheads for ships, and the like.

The machine of the invention can be used either for butt joints, corner joints or T-joints instead of being idle part of the time as in the case of a specialized T-joint machine, and therefore can operate at much lower investment cost.

The present invention constitutes as improvement on Krieweth and Dohm U.S. Patent 3,040,166, granted June 19, 1962, for Machine for Vertical Upward Electric Welding of Vertical Joints. The reader is referred to this patent for details which are not fully explained in the present application, and the patent is incorporated herein by reference.

The machine comprises a frame including a base not shown and uprights 20 and 21 extending substantially vertically (FIGURES 1 and 2). Each of the uprights is desirably in the form of a weldment to provide a track for vertical movement of the carriage as later explained.

Upright 20 in the specific embodiment shown includes an I-beam section 22 and against the outside of one of the flanges there are welded opposed channels 23 and 24 making a box-like section which provides a track and allowing a slot or opening at one side at 25 for insertion of suitable mechanism for guiding the carriage. At the opposite side, upright 21 is a weldment made of a flat bar 26 and at one side thereof there are two opposed channel sections 27 and 28. There is an open slot at 30 through which the carriage guiding mechanism is inserted.

Figure 13:
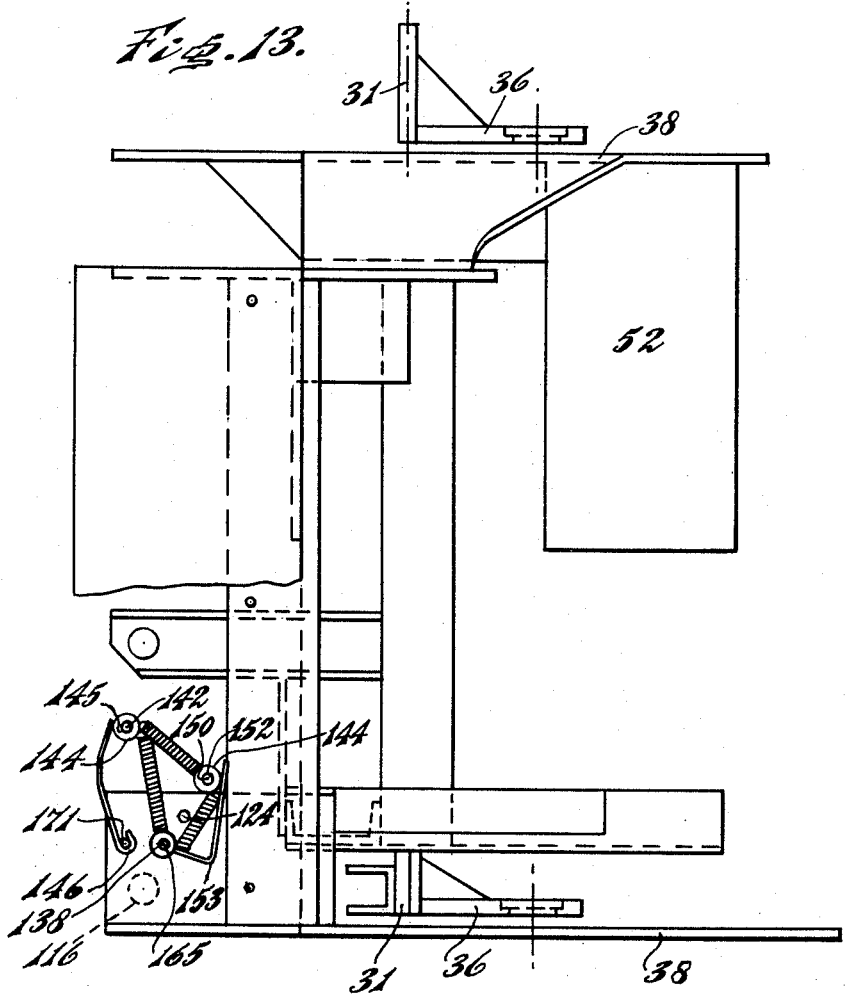
FIGURE 13 is a diagrammatic left side elevation of the device of FIGURE 11 partly broken away to show some aspects of the mechanism.

Operating in the tracks provided by the opposed channels 23-24 and 27-28 there are top and bottom carriage supporting bars 31 (FIGURE 13) best seen in FIGURE 5 which have mounted on the ends thereof suitable rollers 32 which guide the carriage as it travels up and down to keep it essentially vertical. Other unshown rolls, whose plane is parallel to that of bars 31, are used in at least one of the columns, bearing against the inside faces of the channel flanges to maintain verticality of the carriage in its own plane.

The drive to raise the carriage is accomplished by rise motor 33 which operates a built-in hoist manipulating a chain 34 through sprockets not shown to raise and lower the carriage. The chain connects to the carriage at 35, goes over the upper sprocket at the top of track 20 and down the track to the carriage drive as 34.

Bars 31 are connected as by welding with brackets 36, best see in FIGURE 5, on the ends of which are mounted aligned vertical pivot pins 27 which are located behind and to the right of the upright 20 as viewed in FIGURE 2.

Pivotally mounted on the pins 37 are swinging brackets 38 which are of general U formation best seen in FIGURES 2, 4 and 5, the U having a base 40. Arms 41 connect to the pivot pins 37 and arms 42 mount swingable carriage 43.

The swingable carriage comprises a frame 44 which has near the top an opening 45 into which is placed an electrical control panel 46 seen in FIGURES 1, 3 and 4, but not shown in other figures. The electrical control panel 46 is nonswingingly supported from the carriage bar 31 on brackets 46'.

The carriage frame 44 slidably mounts thereon a welding head 51 which reciprocates back and fourth under the action of traverse motor 52 mounted on a speed variator 53 from the swinging bracket 38. The traverse motion is not shown in the form of FIGURES 1 to 10, but is shown in respect to the form of FIGURES 11, 13 and 19 in detail.

The welding head 51 itself is of well known character, and provides a series of rollers 56, some being motor driven as well known, to advance a welding electrode 57 taken from a coil 58 mounted on a reel 60 which rotates on a support 61, mounted on the swinging carriage.

The electrode passes through a conductor and guide tube 59 (which makes electrical connection) to the weld pool where it maintains molten weld metal 54 and molten flux on top at 61, producing a weld 62 between plates 63 and 64 when applied to butt welding. An open seam 65 exists between the plates above the point of butt welding. The traversing mechanism moves the welding head and the electrode or electrodes back and forth in the seam as referred to previously.

An inboard shoe 72 is suitably mounted on the swingable carriage 43 as by a bracket 66, mounting spaced vertical pivot pins 67, which pivotally connect with top and bottom links 68 which at the outer ends pivotally connect at 70 with top and bottom brackets 71 connected to the suitably water-cooled copper shoe 72 which in this case is desirably a flat shoe as shown in FIGURES 1, 2 and 3.

The outboard shoe is also mounted from the swingable carriage by a support 73 mounting spaced vertical pivot pins 74 which pivotally connect by links 75 to spaced vertical pivot pins 76 which are secured on a base 77 which supports a blade 78 passing through the weld gap to the opposite side. At the opposite side the blade 78 supports depending bracket 80 which at its lower end supports spaced horizontal pivot pins 81 which pivotally connect to parallel equal links 82 which at the lower end pivotally connect at 83 with a support 84. The support 84 mounts a vertical pivot pin 85 which mounts spacer 86 which, at the outer end connects with a suitably water-cooled copper shoe 88 which is desirably for butt welding a flat shoe as shown.

When making a T-joint with the machine, the arrangement is modified by swinging the brackets 38 to the position shown in FIGURE 4, in which the continuous or longitudinal plate 63' is parallel to the new position of the swingable carriage 43 and the blade 78 protrudes through the open gap 65' provided between the continuous plate 63' and the plate 64'. In this case an inboard angle shoe 72' is provided across one side of the welding gap 65' and an outboard angle shoe 88' is provided across the opposite side of the welding gap. Both shoes have corner faces pressing against the continuous and the interrupted plates.

To understand the operation of this form of the device and particularly the shifting from butt welding to T-joint welding, it should be kept in mind that electrical controls are required to maintain a stable arc in the electrogas process and a proper current flow is required in the electroslag process and this must be maintained by regulation of the electrical panel 46.

Also the operator must be able to adjust the transverse motion for the electrode and to adjust the shoes. It may be that the plates will deviate slightly from the vertical. To accomplish the change from the standard butt welding position as shown in FIGURES 1 to 3, to the T-joint position as shown in FIGURES 4, 8, 9 and 10, the operator must swing the swingable carriage and must either move the machine to the work or the work to the machine since there is a relatively different relation between the parts as shown in FIGURE 6.

In the T-weld position the face of the swingable carriage 43 which was accessible to the operator in butt welding is now almost against the continuous plate 63' as shown in FIGURE 8. The operator is still in front of the panel 46 but he is behind the position of the carriage which has turned one-quarter turn towards the continuous plate. Since the electrical panel does not move, it remains accessible to the operator. But the traverse mechanism has now changed position and the operator only sees the reverse side of the traverse mechanism. For this reason the controls of the traverse mechanism are duplicated on both sides.

In welding a T-joint as shown in FIGURE 4, the operator normally takes a position within the right angle formed by the electrical panel and the swingable carriage. The shoe supports swing with the swingable carriage, as well as the traverse drive, the electrode feed motor 51 and the reel 60 of electrode wire 57.

Suitable flexible electrical cables connect to the electrical equipment and suitable flexible water and gas connections where required are provided. These are not shown.

In order that the traverse motion can weld both butt joints and T-joints the alternative positions of the structure must meet the following conditions as shown in FIGURE 6.

(1) Both the butt joint and the T-joint must be located at equal distances from the vertical pivot 37.

(2) The straight lines joining the butt joint and the T-joint to the pivot and bound to the swingable carriage respectively 91 and 92, must be at right angles to one another.

This establishes the advantage of locating the pivot pin 37 behind the left track of the machine as viewed in FIGURE 1, as it provides minimum distance between track and joint in both positions, therefore ensuring maximum structural rigidity.

It will be evident from FIGURE 4 that the operator, when located in front of electrical panel 46 with the swingable carriage open for T-joint welding, cannot get close to the shoes and to the tip of the electrode wire guide to vary their proper relation before starting to weld or to make corrections during welding if it is necessary.

In one technique, the operator can stand at a point B shown in FIGURE 6 where he can closely see both the shoes and the electrode and a helper stands at point A to operate the controls, under instructions from operator at B.

As an alternative, the operator can remain in A and use a telescope-periscope 93 shown in FIGURE 7 which in itself forms no part of the present invention, and by this means can view the welding from point A. This device preferably provides the same angle of vision at the eye piece as the angle of vision normally employed by the operator so that the working location will appear to have the same size as it would normally have in a butt joint. The telescope-periscope used particularly aids the operator to view the working point in a T-weld. The controls, as later explained, are also made available near the reel end of the swingable carriage.

Figure 10:
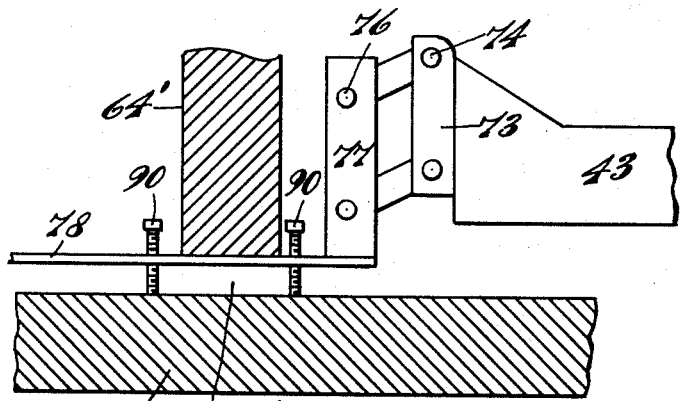
FIGURE 10 is a view similar to FIGURE 9, but showing the structure locked against the abutting plate.

For maintenance and repair, the swingable carriage is swingable to the butt welding position even when T-joint plates are in position. Thus in FIGURE 8 the corner 94 of the swingable carriage must clear the continuous plate 63' as shown by arrow 95 so that the swingable carriage can reach the butt welding position. However, the outboard shoe and its support must then be disconnected from the swinging carriage. For this purpose vertical pivot pins 76 can be withdrawn to release the outboard shoe holder from the carriage while keeping the blade 78 engaged through the weld gap. Support of the outboard shoe is then obtained by tightening screws 90 to engage the blade against the interrupted plate as shown in FIGURE 10. This will lock the outboard shoe into position for ready reattachment when the carriage swings forward again to resume welding after repair.

The inboard shoe 72' of FIGURE 4 can be swung toward the vertical track by its rear control as later described, by an angle sufficient to clear the continuous plate 63' when the carriage is swung back for repairs and the wire guide can be manipulated by the traverse motion until it is at its retracted position before swinging the swingable carriage.

In another form of execution, shown in FIGURES 14 to 18, the inboard shoe is attached to the outboard shoe support so that both shoes and the support remain engaged in the T-joint while swinging the carriage back to butt-welding position for repair.

Considering now the form of FIGURES 11 to 20 inclusive, with special reference to features which have merely been shown diagrammatically in other views, the wire feed motor 51 having the usual guides, electric contacts and feed rollers as previously described, is mounted on a general horizontal pivot 100. The feed motor 51 has a tail extension 101 rigidly secured thereto which is provided with an adjustable stop screw 102 which engages against a round pivot support bar 103 on which the pivot 100 is mounted. The tail extension 101 has a sloping end which is limited in motion by an adjustment screw 104 to position the feed motor in the correct angular relationship. The pivot mounting bar 103 swings on an axis 105 through its center under the action of an arm 106 attached to bar 103 and limited in position by an adjustment screw 107 mounted in an extension 108 of a yoke 110.

The bar 103 is journalled at both ends in the yoke 110 and the yoke at the base is pivoted at 111 under the action of adjustment screw 112 operating on a tail 113 of the yoke 110.

Thus it will be understood that the feed motor can be moved to any desired angular position in three planes perpendicular to each other by making one or more of the adjustments just described.

The vertical pivot 111 is mounted on a plate 114 which moves with all of the structure supported thereon, including the feed motor, on top and bottom tracks 115 and 116 which are suitably of circular cross section and are supported at opposite ends in the frame. Track 115 is surrounded by a longitudinal channel bar 117 which is provided with roller shoes 118 and 120 which suitably provide four rollers at quadrant positions to guide the channel bar 117 in its movement longitudinally on the track. The plate 114 also has a bar extension 121 which carries rollers 122 at opposite sides of the bottom track 116 to permit guiding the bar extension 121 as it moves back and forth thereby preventing rotation of channel 117 around track 115.

Fastened on the channel bar 117 is a follower 123 which supports a nut 124. The nut is a ball nut of well known character which engages a traverse ball screw 125 threading through the nut. The screw 125 is secured at one end in a coupling 126 on shaft 127 which is journalled at opposite ends in bearings 128 and 130 mounted on the frame.

Surrounding the shaft but free from it are miter gears 131 which are turning in opposite directions and at the rear constantly mesh with a cooperating driving miter gear 132 on a suitable cross shaft and driven by a suitable drive from motor 52.

Rigidly positioned on the shaft 127 on opposite sides of the miter gears 131 are electromagnetic friction clutches 133 of a suitable type well known in the art. One satisfactory clutch for this purpose is manufactured by Eaton Manufacturing Company, Kenosha, Wisconsin, Eaton Dyna-Torq Model 303S, which has, as well known and as not shown on the drawing, a coil mounted stationarily, a hub connected to the shaft and another hub connected to one of the miter gears 131. The construction and operation of the electromagnetic clutch are described in the Eaton Dyna-Torq catalogue Bulletin RSF-2 for November 1961, and result in ball screw 125 rotating in one direction or in the opposite direction depending on which clutch 133 is energized electrically at the time. Suitably keyed on the shaft 127 is a pulley 134 which is engaged by a braking shoe operated by an electric solenoid, blocking the shaft 127 against free rotation when neither clutch is energized.

The limit of the traverse motion at opposite ends is provided by a front adjustment 135 and a rear adjustment 136.

Figure 11:
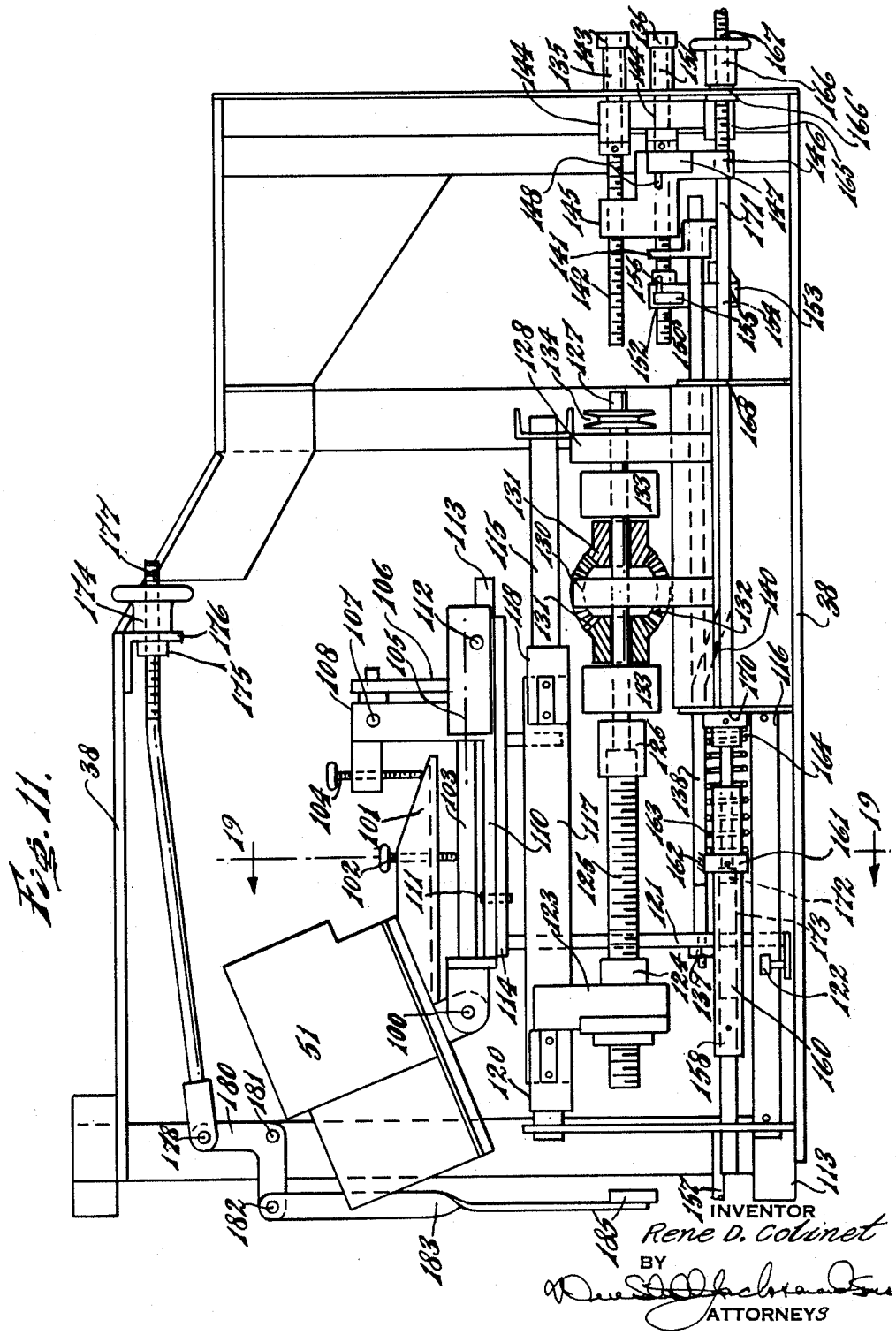
FIGURE 11 is a diagrammatic front elevation view of a modified form of the device of the invention.
Figure 12:
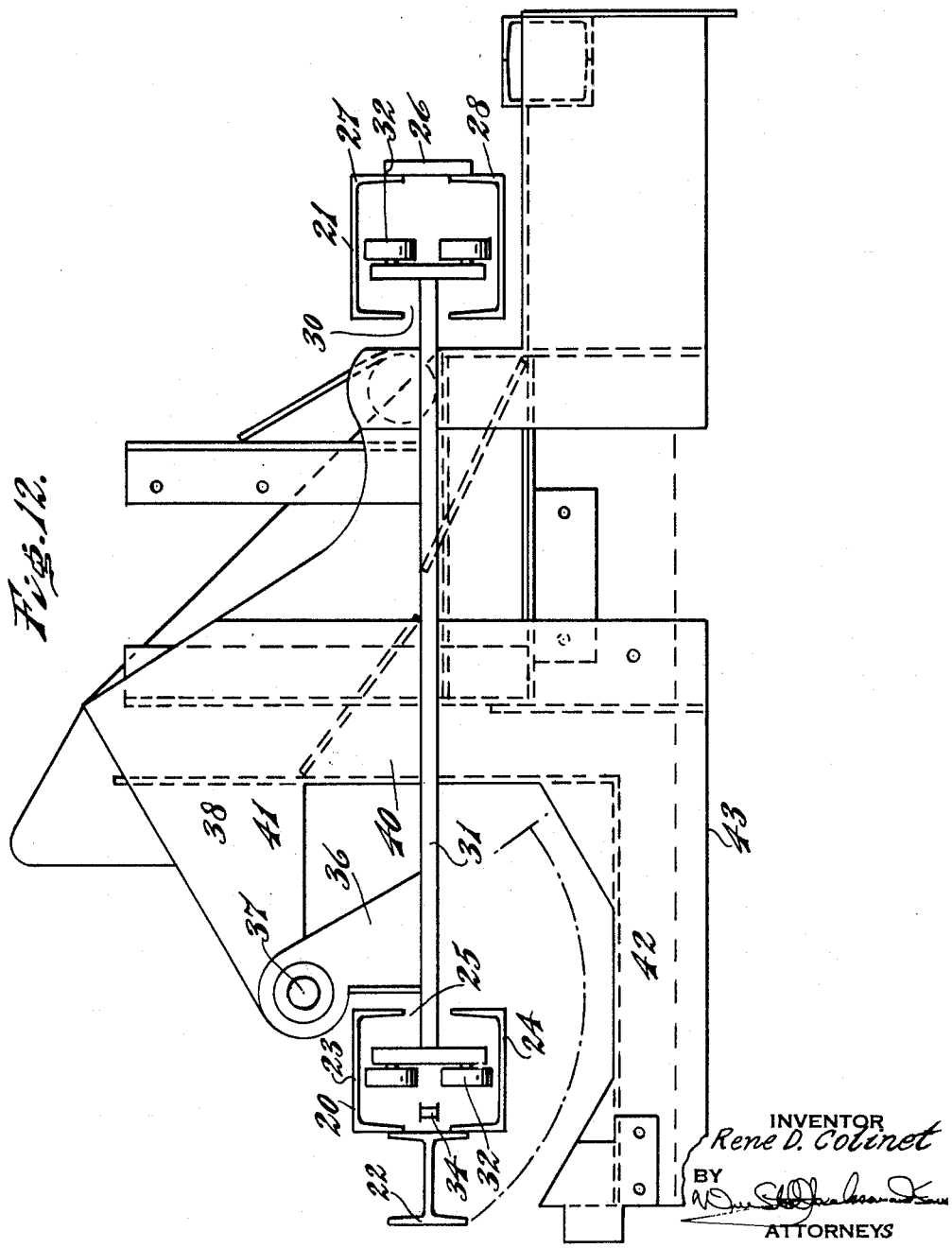
FIGURE 12 is a diagrammatic top plan view of the device of FIGURE 11.

The bar extension 121 has fastened thereto at 137 a horizontal bar which has secured thereon at the right end of FIGURE 11 a dog 141 which moves back and forth with the traversing carriage. The front adjustment 135 comprises a screw 142 turned by a knob 143 and journalled in a bushing 144. Threaded on the screw 142 is a nut 145 which is guided at the lower end by a downwardly extending strap 146 which rides on the lower end of the horizontal bar 171. The strap 146 on nut 145 carries mounted thereon a precision switch 147 which has an operating plunger 148 which in the right limiting position is operated by the dog 141 to cause reversal after an adjustable dwell time.

The rearward adjustment 136 is provided by a horizontal screw 150 turned by a knob 151 and journalled in a bushing 144 as earlier described. A nut 152 is threaded on the screw and has a downward extension 153 which at the lower end engages around and guides on a longitudinally extending bar 154 secured at opposite ends to the frame. The nut 152 carries a precision switch 155 which has a plunger 156 which in the left limiting position of the traverse motion is engaged by the dog 141 to cause reversal after an adjustable dwell time.

Automatic operation of the traverse mechanism just described is obtained by suitable electric controls which provide a self-recycling sequence of motions and blockings, comprising:

*Step a.*—Motion of the traverse carriage to the right limit.

*Step b.*—Blocking in right position for a predetermined dwell time.

*Step c.*—Motion to left limit.

*Step d.*—Blocking in left position for a predetermined dwell time.

Motion is derived from the continuous rotation of driving miter gear 132 actuated by motor 52 through speed variator 53 (FIGURE 2). Sequencing is triggered by the completion of each step initiating the following step, with step *d* starting step *a* for repeated cycling.

Figure 20:
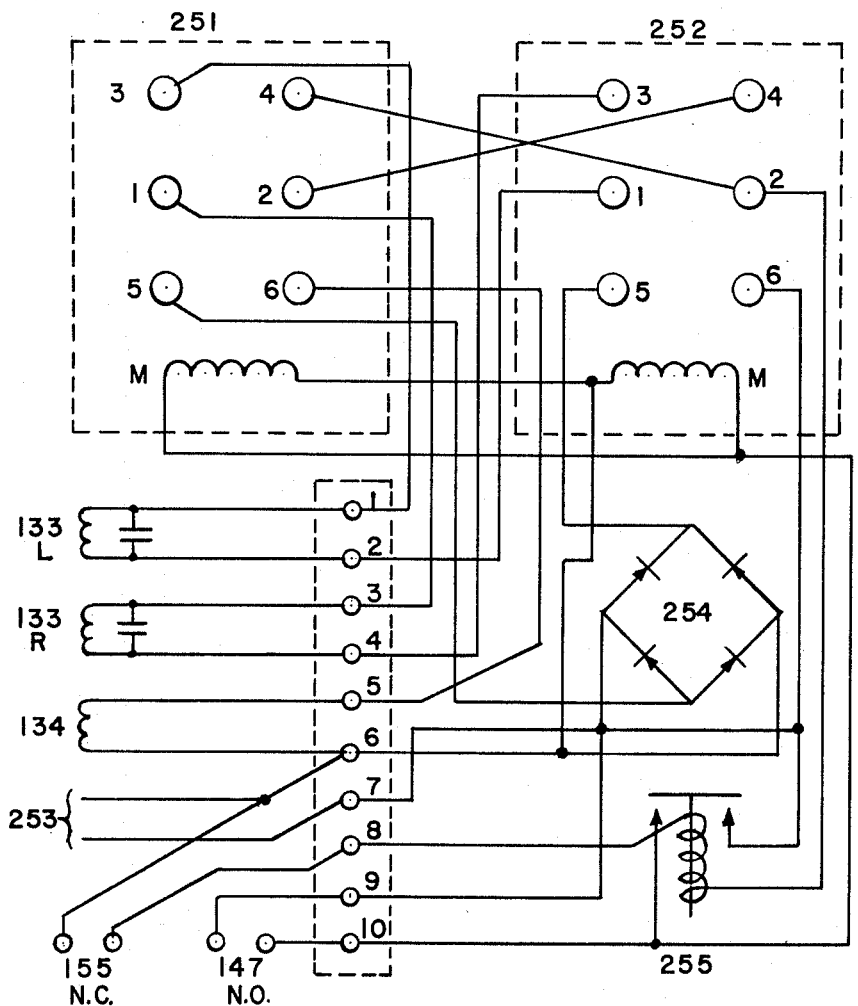
FIGURE 20 is an electric circuit diagram useful in explaining the invention.

In a preferred embodiment of the electrical circuitry providing automatic sequencing, shown by schematic diagram FIGURE 20, a commercially available pneumatic dash-pot type delayed action, double pole, double throw, electrical relay 251 (such as Agastat DEW-22) is used for step *d* above. It provides instant closing of contacts 3–5 and 4–6 when energized through coil M, and delayed closing of contacts 1–5 and 2–6 together with opening of contacts 3–5 and 4–6, after a preset dwell time of 0 to 10 seconds (preferably 5 seconds), when coil M is de-energized.

A similar relay 252 (such as Agastat DEW-12) is used for step *b*. It provides delayed closing of contacts 1–5 and 2–6 after a waiting dwell time beginning when its coil M is energized. When de-energized, contacts 3–5 and 4–6 close instantly while contacts 1–5 and 2–6 open instantly.

Referring to FIGURES 11 and 20, power is applied permanently from a standard supply source of alternating current 253 to a full-wave rectifier 254 through terminals 6 and 7. The rectified current is applied to one or the other of the two electromagnetic clutches 133 through relays 251 and 252 connected in series or tandem. The coils M of relays 251 and 252 are connected in parallel and energized during steps *b* and *c*, through right limit switch 147 and through the contacts of holding relay 255 whose coil is controlled by left limit switch 155. Coils M are de-energized during steps *d* and *a*.

The coil of brake 134 is energized by the source of A.C. current through terminals 5 and 6 with contacts 2–6 of relay 251 and contacts 4–6 of relay 252 in series.

Summarizing the sequencing with motor 52 running and A.C. power applied to terminals 6 and 7:

*Step a* (motion to right).—Right clutch 133 is energized by contact 3–5 of relay 252 and contact 1–5 of relay 251. Brake coil 134 is energized, liberating shaft 127.

*Step b* (dwell).—Right limit switch 147 energizes coils M of relays 251 and 252, with instant shut-off of right clutch 133 and of brake coil 134, blocking shaft 127. After the dwell time has elapsed, brake coil 134, left clutch and the coil of holding relay 255 are energized, liberating shaft 127 and starting traverse to the left.

*Step c* (motion to left).—During this step, coils M of relays 251 and 252 remain energized by the contacts of holding relay 255.

*Step d* (dwell).—Left limit switch 155 de-energizes the coil of holding relay 255, opening its contact, whereby coils M de-energize, as well as left clutch 133 and brake coil 134, blocking shaft 127. All these actions are instantaneous. After the dwell time has elapsed, brake coil 134 energizes, liberating shaft 127 and right clutch 133 energizes as per step *a*, completing the cycle and repeating it.

It is not always certain that the plates will be absolutely vertical, and it is possible in some cases that there may be some slight misalignment from the vertical. Therefore, to avoid the need of readjusting both traverse limits when the shoes move in following the plate deviations from true verticality the traverse mechanism in the present device operates in response to the position of the shoes.

A feeler bar 157, best seen in the left of FIGURE 11, and maintaining always contact with the inboard shoe, is mounted on a plunger 158 secured to a tubular plunger extension 160 which has fastened thereon a collar 161 which is secured as by welding at 162 to the horizontal bar 138. This tubular extension of the feeler plunger is surrounded by helical compression spring 163 which acts from spring abutment 164 locked on bar 167. The bushings 144 which journal the adjustment screws 142 and 150 are secured at 165 to the end of the horizontal bar 138 behind bar 167. The pressure of the helical spring 163 is adjusted by adjustment nut 166, journalled at 166' in the frame, which threads on a screw 167 slidably guided at 170 and 166' in the frame and carrying the spring abutment 164 at the forward end. The adjustment screw 167 extends through a bore in and guides the plunger tubular extension 160. This rod 167 has at the inner end an enlarged head 172 which occupies enlarged cavity 173 in the tubular plunger extension 160 and can be used to pull the plunger toward the right in FIGURE 11 under the action of the adjustment screw 167.

It will be evident that if the shoes move laterally due to slight misalignment, the feeler 157 permits the whole traversing mechanism to move under the action of spring 163 laterally as required to correct, so that the electrode cannot come close enough to either one of the shoes to burn the shoe.

As best seen in FIGURE 14, shoes 72 and 88 in an improved form of execution are provided on opposite sides of the weld gap. These may be either of flat design or of angular design depending on whether a butt joint or a T-joint is being welded. The inboard shoe 72 is mounted on column 230 and is manipulated laterally by threaded nut 174 (FIGURE 11) journalled at 175 in a bracket 176 in the frame. Nut 174 is threaded on screw 177 which is pivotally connected at the outer end at 178 to a bell crank 180. The bell crank is fixedly pivoted at 181 on the carriage frame post and at the opposite end the bell crank is pivotally connected at 182 to pull rod 183. The pull rod at its lower end (FIGURES 14 and 16) is pivotally connected at 184 to rocker 185 best seen in FIGURE 16. The rocker is fixedly pivoted intermediate its ends at 186, on the frame post. At the opposite end the rocker is pivotally connected at 187 to link 188 which is pivotally connected at the lower end at 190 to a bracket 191 which is secured as by welding to the lower of a pair of vertically aligned blocks 192 which are pivoted at 193 and journalled at 194 in the frame.

The top and bottom blocks 192 at distances remote from the pivots 193 pivotally connect at vertically aligned horizontal pivots 195 with parallel equal top and bottom links 196 paired by spacers 200 and which at the lower ends pivotally connect at 197 to top and bottom blocks 203 having pivots in column 230; side extensions 198 to links 196 pivotally connect at 201 to a link 202 extending between the pivots 201 to maintain verticality of column 230 in the plane of the paper in FIGURE 14.

Upper and lower blocks 203 have lateral lever arms 203' which pivotally connect at the top and bottom ends at 204, to a link 205 which assures that the top and bottom blocks are moving together angularly in the plane of the paper in FIGURE 15 thereby maintaining verticality of column 230 in said plane.

The inboard shoe 72 is mounted on a bracket not shown secured in a vertical position on the column 230. A blade 78' extends through the weld gap to the outboard side of the weld plates, and suitably consists of a series of beams 231 (FIGURES 14 and 18). Engaging the edges thereof and extending longitudinally of the beams are a series of tubes 232 feeding cooling medium to the outboard shoe, such as water, and arc-shielding gas such as carbon dioxide.

At the outboard end the blade is suitably connected to an outboard column 233 best seen in FIGURES 14 and 15. At the lower end the outboard column 233 has two parallel horizontal pivots 234. The pivots 234 pivotally connect at the upper ends of parallel equal links 235, the links suitably having stiffening webs 236 to strengthen them. At the lower ends the links connect to pivots 236' which are in the same horizontal plane and are parallel to one another. The pivots are on block 237 which has secured thereto and extending vertically a pivot pin 238, which has fixed at the lower end a channel member 240 (FIGURES 14 and 17). Surrounding the pivot pin 238 and swingable in the channel is a sleeve 241 which has secured thereon a spacer 242 which mounts at the outer end the welding shoe 88.

The angular position of the spacer and thus of the shoe 88 is controlled by opposed adjustment screws 243 acting on the spacer and threaded through the sides of the channel 240 as best seen in FIGURE 17.

The outboard shoe is urged against the plates in the weld gap by a screw 244 best seen in FIGURE 14 which pivots at 234 on one of the upper link pivots. A nut 245 is threaded on the screw 244 and acts through a spacer sleeve 246 surrounding screw 244 on a trunnion 247 having an opening through which the screw passes and which is pivoted at 248 at the opposite side of two of the links 235 so that by tightening the nut the links 235 can be moved to urge the outboard shoe 88 against the work.

In view of my invention and disclosure, variations and modifications to meet individual whim or particular need will doubtless become evident to others skilled in the art, to obtain all or part of the benefits of my invention without copying the structure shown, and I, therefore, claim all such insofar as they fall within the reasonable spirit and scope of my claims.

Having thus described my invention what I claim as new and desire to secure by Letters Patent is:

1. In a device for the vertical welding of plates in two different relationships, uprights, a carriage vertically movable on the uprights, a swingable carriage mounted on the vertically movable carriage, said swingable carriage disposable in one position for vertical welding substantially parallel to the plane of the axes of the uprights and in the alternative in a position substantially perpendicular to the plane of the axes of the uprights, means for swinging the swingable carriage between the two positions for vertical welding and an electrode feed mechanism mounted on and movable with the swingable carriage.

2. A welding device of claim 1, in combination with traversing means mounted on the swingable carriage and supporting the electrode feed mechanism to traverse the electrode.

3. A welding device of claim 2, in combination with weld shoes for closing a weld gap, means for supporting the weld shoes from the swingable carriage, sensing mechanism for following the position of one of the weld shoes and means for shifting the relative position of the traversing mechanism in response to the position of the sensing mechanism to correct for deviation of the weld shoes from the vertical.

4. A welding device of claim 2, in combination with a constant rotating motor, opposed miter gears operatively connected to said motor, opposed electromagnetic clutches respectively driven by the different miter gears, a reversible rotatable shaft alternatively operatively connected to said electromagnetic clutches, an electric brake blocking said shaft when both said clutches are deenergized and liberating said shaft when one of said clutches is energized, two double pole double throw time delay relays in series with said electromagnetic clutches, a holding relay, two stroke limiting contacts actuated by the transverse motion and electric circuit connections for activating the clutches, the brake and the holding relay.

5. A welding device of claim 2, in combination with a reel for supporting an electrode on the swingable carriage, controls for the traversing mechanism on the swingable carriage adjoining the reel, an inboard weld shoe, means for positioning the inboard weld shoe mounted on the swingable carriage and means for adjusting the inboard weld shoe from the end of the swingable carriage adjoining the reel.

6. A welding device of claim 1, in combination with inboard and outboard weld shoes, means for supporting the weld shoes from the swingable carriages and means for moving the weld shoes horizontally toward and away from each other while maintaining them in parallel relationship, said moving means including parallel links of equal length pivoted in spaced relation between a weld shoe at one end and the swingable carriage at the opposite end.

7. A welding device of claim 6 including means for laterally adjusting the weld shoes while they remain in parallel relation.

8. In a welding machine for vertical welding in both a butt welding position and also a T-welding position, a plurality of uprights, one located adjacent to the work and one located remote from the work, a vertically movable carriage moving vertically with respect to the uprights, a pivot on the vertically movable carriage located adjacent to and beyond the adjacent upright, a swingable carriage swingable on the pivot between the butt welding and the T-welding positions, traversing drive means mounted on the swingable carriage and electrode feed mechanism positioned on the traversing drive means.

9. A welding device of claim 8, in which said pivot is equidistance to the locations for butt welding and T-welding.

10. A welding device of claim 8, in which a line extending between the pivot and the location for butt welding is at right angles to a line extending between the pivot and the location for T-welding.

11. In a mechanism for vertical welding in a weld gap, uprights, a carriage vertically movable on the uprights, a swingable carriage mounted on the vertically movable carriage, an outboard shoe, and supports for the outboard shoe connected to the swingable carriage including a plurality of beams adapted to extend through the weld gap, and tubes interposed between the beams and engaging the edges thereof at least two of said tubes to provide cooling for the outboard shoe, the remainder to provide a weld-shielding gas for the weld gap and means for distributing the weld-shielding gas and for circulating the cooling medium through their respective tubes.

12. An electric welding mechanism for the vertical welding of plates in different relationships, uprights, a vertically movable carriage supported and guided by the uprights, a swingable carriage mounted on the vertically movable carriage an outboard shoe, a blade connected to the outboard shoe and detachably connected to the swingable carriage and adapted to extend through the weld gap, and means for securing the blade to the plates to maintain its position when the blade is detached from the swingable carriage.

13. In an electric welding mechanism for vertical welding, uprights, a carriage vertically movable on the uprights a swingable carriage mounted on the vertically movable carriage, inboard and outboard weld shoes, means for supporting the weld shoes from the swingable carriage, means for retaining parallelism between the inboard and outboard weld shoes, said parallel retaining means including parallel links of equal length pivoted in spaced relation between a weld shoe at one end and the swingable carriage at the opposite end and means for laterally adjusting the weld shoes while they remain in substantial parallel relation.

References Cited by the Examiner
UNITED STATES PATENTS

| | | | |
|---|---|---|---|
| 2,742,554 | 4/56 | Westfall | 219—126 |
| 2,997,571 | 8/61 | Smout | 219—126 |

RICHARD M. WOOD, *Primary Examiner.*